(12) United States Patent
Reilly

(10) Patent No.: US 7,245,199 B1
(45) Date of Patent: Jul. 17, 2007

(54) MITER BAR

(76) Inventor: Paul J. Reilly, 560 N. Moorpark Rd. PMB 150, Thousand Oaks, CA (US) 91360

( * ) Notice: Subject to any disclaimer, the term of this patent is extended or adjusted under 35 U.S.C. 154(b) by 105 days.

(21) Appl. No.: 11/082,500

(22) Filed: Mar. 18, 2005

Related U.S. Application Data

(60) Provisional application No. 60/560,776, filed on Apr. 7, 2004.

(51) Int. Cl.
*B27G 23/00* (2006.01)

(52) U.S. Cl. ............... 338/640; 33/628; 33/DIG. 1

(58) Field of Classification Search .......... 33/640–641, 33/626, 628, 630, DIG. 1, 471; 83/435.14
See application file for complete search history.

(56) References Cited

U.S. PATENT DOCUMENTS

| 6,263,584 | B1 * | 7/2001 | Owens | 33/640 |
| 6,434,852 | B1 * | 8/2002 | Tarris et al. | 33/640 |
| 6,665,946 | B1 * | 12/2003 | Reilly | 33/640 |
| 6,776,076 | B2 * | 8/2004 | Salazar | 83/435.14 |
| 2005/0139056 | A1 * | 6/2005 | Gass et al. | 83/438 |

\* cited by examiner

*Primary Examiner*—Yaritza Guadalupe-McCall
(74) *Attorney, Agent, or Firm*—Allen A. Dicke, Jr.

(57) ABSTRACT

The saw table guide bar has magnets thereon so that when it is inserted into the slot in an iron saw table it is urged to slide along the side of the slot. The magnetic saw table guide bar is used to support various measuring devices and overcomes measuring difficulties resulting from table slots of varying width.

20 Claims, 4 Drawing Sheets

MITER BAR

CROSS REFERENCE

This application relies for priority on the Provisional Application entitled "Magnetic Miter Slot Bar," filed Apr. 7, 2004, Ser. No. 60/560,776.

BACKGROUND OF THE INVENTION

Many woodworking and other machines have a spindle rotating on an axis. This axis is used as a reference for setting the various tools guides and surfaces on the machine. On a table saw, a circular saw blade is mounted on the spindle. This blade is flat and lies in a plane at a right angle to the spindle axis. The table saw has a ferrous table with a saw slot therein. The saw blade extends up through the saw slot, to extend above the table surface. For most purposes, the table surface is at a right angle to the plane of the saw blade so that square cuts are made. The workpiece has a flat surface which lies against the plane of the table surface. Moving the workpiece past the blade makes the cut surface at a right angle to the table surface, as long as the spindle is positioned correctly. The surface of the ferrous saw table has a miter slot therein which is used to guide workpieces past the saw blade. Therefore, the direction of the miter slot must be parallel to the plane of the saw blade. In addition, the rip fence must be parallel to the plane of the blade. If the rip fence or the miter slot are not parallel to the plane of the blade, then the workpiece will be moved toward or away from the blade during the cut. This is undesirable for several reasons, including the fact that smooth cutting is not achieved. In addition, saw noise is increased. In other cases, the cut surfaces have burn marks from the saw blade. Another important reason is that there is a threat of kickback of the workpiece as it is being cut.

In the past, setting up the table saw has been very time-consuming and filled with a large amount of trial and error. The most successful alignment has been done by craftsmen who have had many years or experience. However, machinery of this type does not stay in adjustment because the machinery is hard-working and is subject to heavy loads and pounding from the lumber which it crosscuts, rips or dados. There is need for tools which permit a craftsman who is skilled in woodworking but who is not skilled in machinery to adequately align and calibrate table saws to their optimum adjustment. The procedure must be easy to accomplish and must allow the operator to adjust and calibrate the saw quickly and accurately.

The prior U.S. Pat. No. 6,665,946 to Paul J. Reilly discloses a machine alignment system which aids in the alignment of the table surface at a right angle to the plane of the saw blade and relates the adjustment of the table so that the miter slot is parallel to the plane of the saw blade. It also discusses the problems of accurate engagement with the miter slot.

BRIEF SUMMARY OF THE INVENTION

In order to aid in the understanding of this invention, it can be stated in essentially summary form that it is directed to a miter slot bar for sliding in the table slots of table saws and the like to carry a measuring instrument thereon. The measuring instrument is for interacting so that the parallelism of the miter slot with respect to the plane of the saw blade can be established. The miter bar has a reference side surface for engagement against one side of the miter slot and has magnets on the miter slot bar which magnetically urge the miter slot bar toward that side of the miter slot.

It is, thus, a purpose and advantage of this invention to provide a magnetic miter slot bar which is part of an alignment system that assures correct alignment between the miter slot, saw blade, rip fence and miter gages in table saws, top saws and the like so that the saws can be accurately set up to make clean, safe and accurate cuts.

It is another purpose and advantage of this invention to provide a magnetic miter slot bar which is part of an alignment system which is useful for aligning and calibrating various machinery which has tables with miter slots therein so that the tables, spindles, rip fences and miter gages can be adjusted.

It is another purpose and advantage of this invention to provide an alignment system which includes a slide bar which carries a measuring device thereon so that the slide bar can slide along the miter slot and the table and the measuring device indicates parallelism of the miter slot to the saw blade or fence. These adjustments are critical for safe and maximum performance use of the table saw.

It is another purpose and advantage of this invention to provide an alignment system which includes a slide bar which fits into the miter slot of a table and fits within the slot and can travel the full length of the miter slot with precision so as to ensure accurate measuring readings from the miter slot to the plane of the saw blade.

It is another purpose and advantage of this invention to provide a slide bar which can carry a dial indicator for measurement of the distance from the table miter slot to the plane of the saw blade on a saw fence.

It is a further purpose and advantage of this invention to provide a miter slot bar which fits within the miter slot of a saw table and to place magnets on the miter slot bar so that the magnets pull the miter slot bar toward one side of the miter slot.

Other purposes and advantages of this invention will be noted from the study of the following portion of the preferred embodiment and the attached claims.

DESCRIPTION OF THE PREFERRED EMBODIMENT

This invention is directed to an alignment system which is particularly useful for table saws and the like. The alignment system assures correct alignment between the miter slot, rip fence and miter gages with respect to the plane of the saw blade. It is particularly useful in table saws and the like so that the saws can be accurately set up and make clean, safe, accurate cuts. The system is particularly useful with any machinery which has a miter slot in the table.

Figure 1:
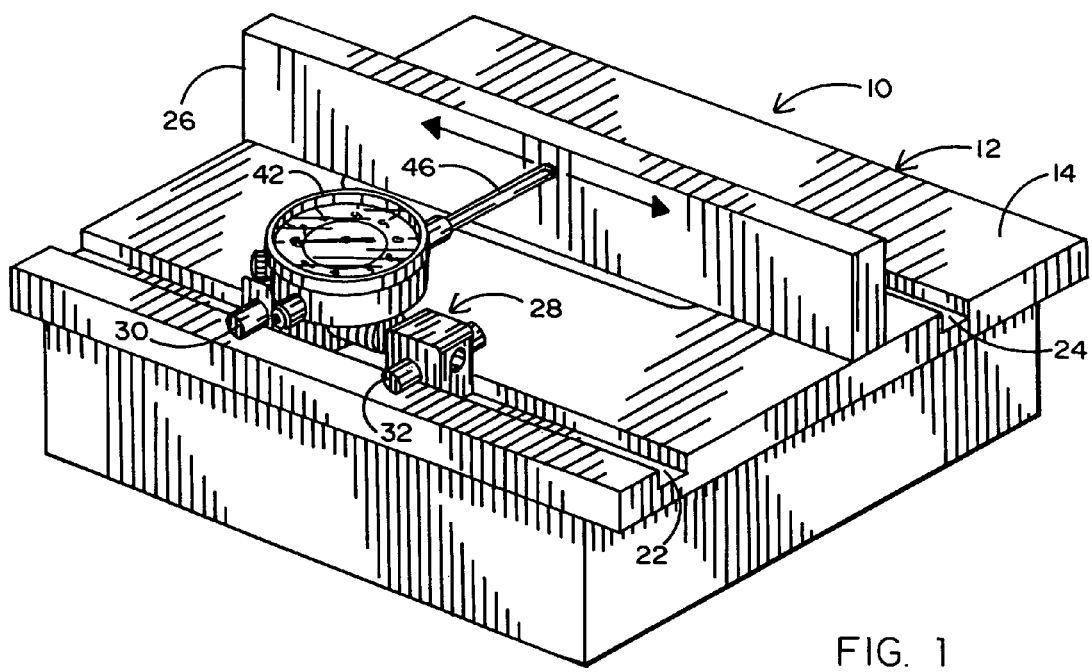
FIG. 1 is an isometric view of a table saw showing a miter slot in the table and showing the alignment system of this invention associated with the table top and the miter slot.
Figure 4:
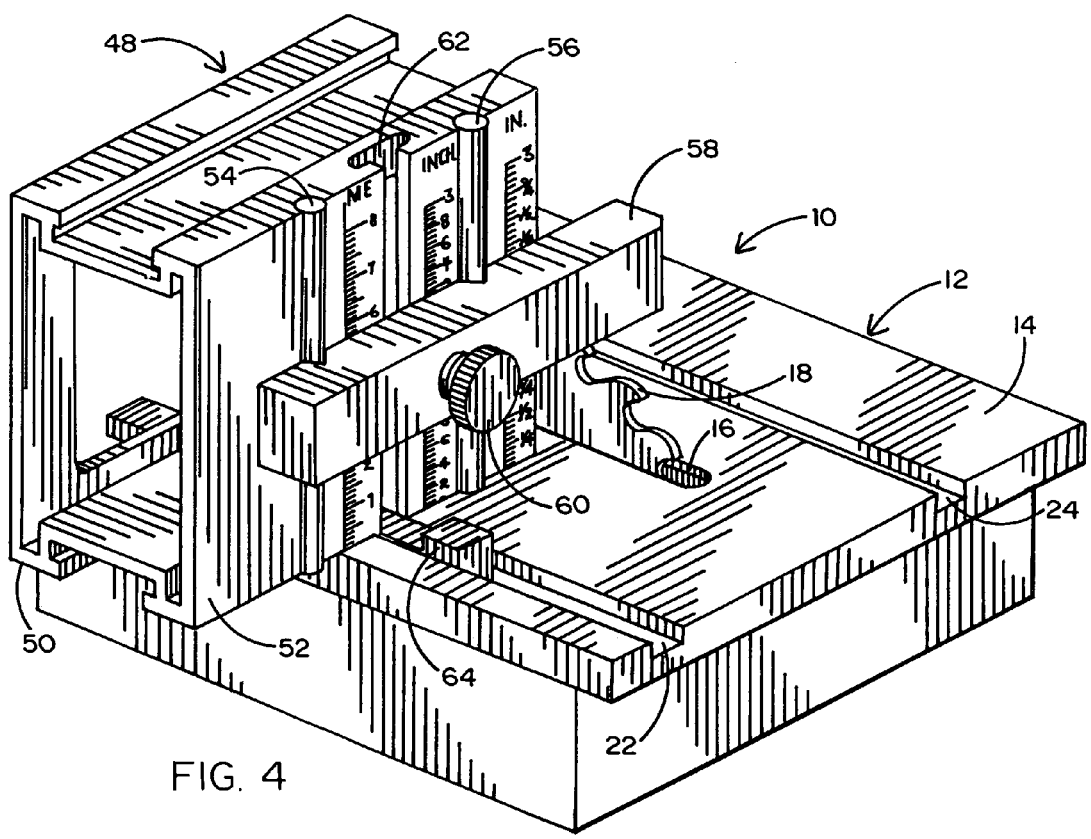
FIG. 4 is an isometric view of the alignment system of this invention wherein the magnetic miter slot bar carries and guides a Master Gage.

Table saw 10, seen in FIGS. 1 and 4, has a saw table 12 which has a planar top surface 14. There is a saw slot 16 in the table. A spindle below the table top defines an axis. Mounted on this spindle is saw blade 18. It is the spindle axis which defines the line to which all relevant surfaces are related. Sometimes the spindle is tiltable with respect to the top surface of the saw table, but for the purpose of this discussion, this preferred embodiment of the magnetic miter slot bar will describe the situation in which the axis is parallel to the top surface 14. This places the side surface 20, see FIG. 6, at a right angle to the top surface 14.

In addition, the saw table 12 has first and second miter slots 22 and 24 cut into the table below the surface 14. These miter slots are presumably straight and parallel. Another conventional device on the table saw is fence 26, see FIG. 1. The fence is movable in the direction of the spindle axis and is intended to lie parallel to the side surface 20 of the saw blade.

Figure 2:
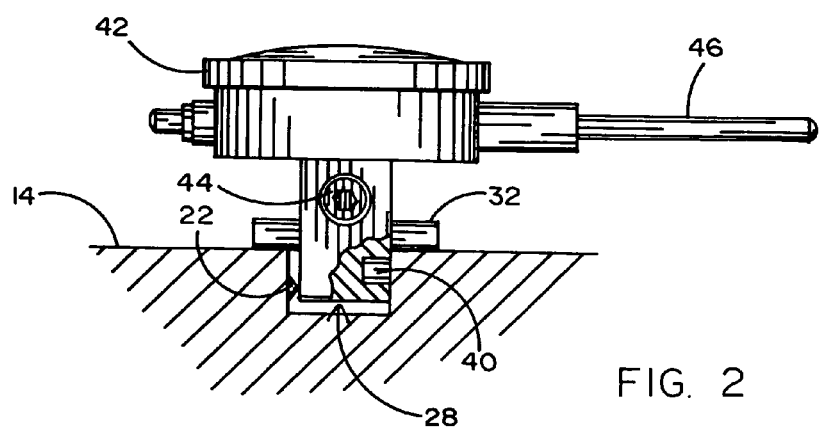
FIG. 2 is an enlarged end view thereof, with the table taken in section and part of the miter slot bar broken away.
Figure 3:
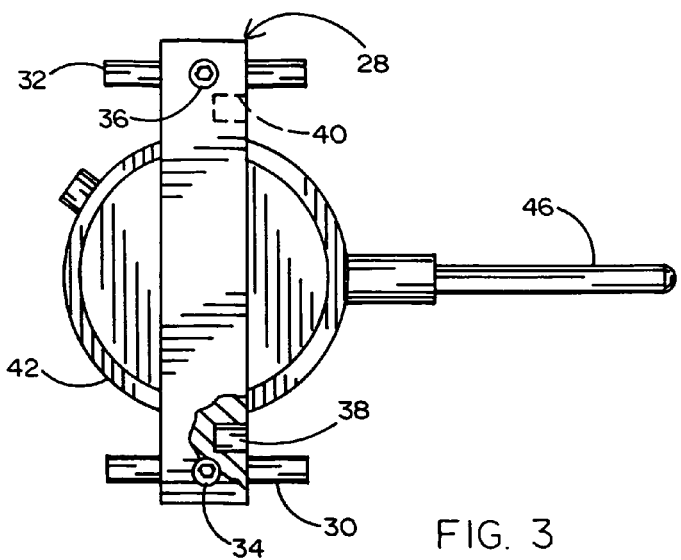
FIG. 3 is a bottom view of the miter slot bar, with parts broken away.

In order to measure the relationship between the miter slot and the saw blade, which represents the spindle axis, a bar 28 is provided, see FIGS. 1, 2 and 3. The bar 28 is narrower than the miter slot, see FIG. 2. The bar has ride pins 30 and 32 extending therethrough, which ride pins are spaced close enough to the bottom of the miter slot bar that, when the ride pins are on the top surface of the saw blade, the bar 28 does not reach to the bottom of the miter slot, see FIG. 2. This prevents accumulated detritus in the bottom of the miter slot from interfering with motion of the bar along the length of the miter slot. The ride pins may be held in place by any convenient structure, such as socket head set screws 34 and 36 seen in FIG. 3. The ride pins may be made of low friction material to provide a good bearing pair. The ride pins may be renewed, as required, by loosening the set screws.

In addition, as seen in FIG. 2, the width of the bar 28 is smaller than the width of the miter slot. Sometimes the miter slot may be of a different width at different positions along its length due to poor machining, warpage of the table during the manufacturing process or aging. In order to maintain the guide bar in position against one wall of the miter slot, magnets are provided. FIG. 3 shows magnets 38 and 40 which are inset into the side of guide bar 28. They are preferably flush with that side of the guide bar. The may be held in place by any convenient structure, such as adhesive, set screw or pin. The guide bar is preferably non-magnetic in order not to interfere with the magnetic field set up by these magnets. The magnets attract the guide bar to one side of the slot. In this case, it is the side of the slot toward the saw slot. The magnets have considerable strength in preventing the guide bar being moved away from the side surface of the slot, but the magnets do not significantly restrain the slide bar from moving along the length of the slot. The magnet can slide along the length of the slot with considerably less force than necessary to move the magnet away from its closest slot wall. Making the slide bar considerably narrower than the miter slot and positioning the embedded magnets in one side of the slide bar will cause the slide bar to cling to the closest side of the miter slot. The slide bar will traverse the full length of the miter slot, all the while clinging to that one wall of the miter slot.

Figure 6:
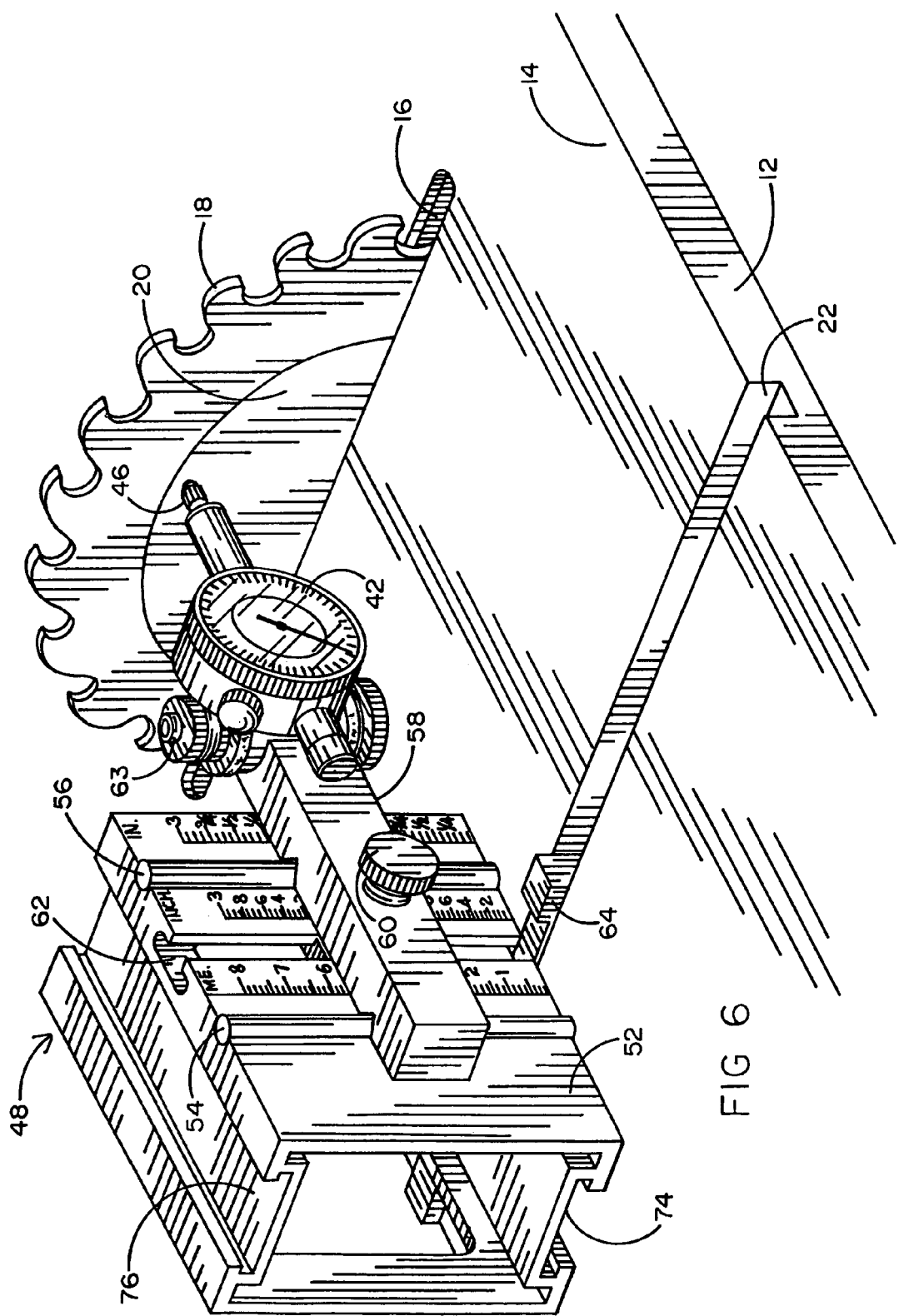
FIG. 6 is a view similar to FIG. 4, but showing a dial indicator mounted on the miter gage for measuring the distance to the saw blade.

Dial indicator 42 is mounted on the guide bar 28 by any convenient means. In this case, a tang on the dial indicator enters into a crosswise slot in guide bar 28, and machine screw 44 holds it in place. The finger 46 on the dial indicator can be used to measure distances as the slide bar is moved along the length of the miter slot. In FIG. 6, the dial indicator is used to measure side surface 20 of the saw blade. It is this measurement which is used to adjust the table to make the table slot 22 parallel to the plane of the saw blade. In FIG. 1, presumably the saw table has already been adjusted so that its miter slot is parallel to the plane of the saw blade. In FIG. 1, the miter slot 22 is the reference, and it is used to set the fence 26 parallel to the miter slot. The parallel measurements from the one side of the miter slot wall to the saw blade and to the rip fence 26 are extremely accurate since there are no inaccuracies of miter slot width to contend with.

This results in measurement which is free of perturbations resulting from differences in the width of the miter slot. The slide bar will move along the length of the miter slot with little effort, yet will resist becoming detached because the force holding the slide bar against the slot wall is far greater than the force required to move the guide bar along the miter slot. This magnetic miter slot bar assures that there will be no measurement errors resulting from differences in miter slot width. When the magnetic miter slot bar is employed in an alignment system, errors due to differences in miter slot width are avoided. This assures correct alignment between the saw blade, the miter slot and the rip fence in table saws. The alignment system is also useful in aligning and calibrating various machinery which has miter or similar slots.

Figure 5:
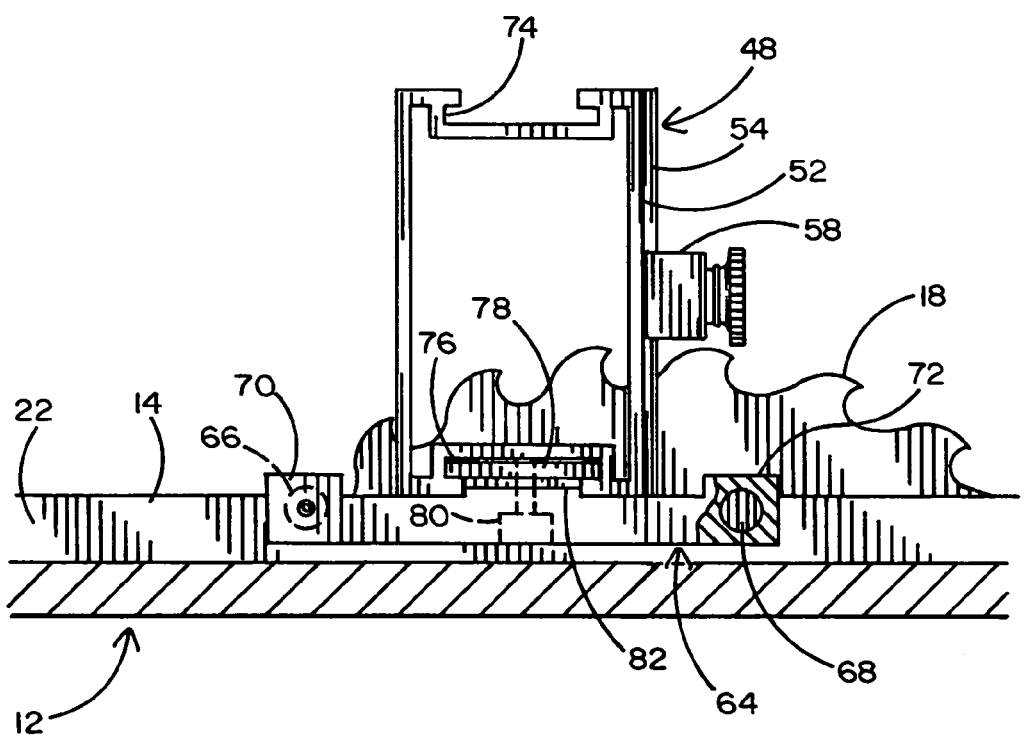
FIG. 5 is a left-end view thereof, with a section taken through the table at the miter slot.

A magnetic miter slot bar can also be used in connection with a gage block, such as gage block 48 shown in FIGS. 4, 5 and 6. The gage block 48 is in the form of a rectangular tubing and has a bottom surface 50 for engagement against the top surface 14 of the saw table. Front face 52 is at a right angle with respect to the bottom surface 50. Front face 52 carries two parallel upright cylindrical guide bars 54 and 56. These guide bars are at a right angle to the bottom surface 50, which is planar. Level arm 58 has two V-shaped guide notches which are spaced apart the same distance as the guide bars. These notches engage over the guide bars to retain the level arm 58 always parallel to the planar bottom surface 50. Thus, the under surface of the level arm serves as a height measure with respect to the table top. The level arm can be clamped in a selected position with respect to the bottom surface by means of a clamp screw 60 which extends through the level arm and engages in a T-nut in T-slot 62. More detail of the gage block 48 can be found in U.S. Pat. Nos. 5,491,906 and 5,826,346, the entire disclosures of which are incorporated herein by this reference. As seen in FIG. 6, the dial indicator 42 is secured to the outer end of the level arm by any convenient means, such as a clamp bolt 63 through the boss on the bottom of the dial indicator and through a hole through the end of the level arm. The dial indicator can thus be used as a measurement to the saw blade or other reference surface, such as an alignment plate or a saw fence.

The bar 64, shown in FIGS. 4, 5 and 6, is sized to engage into the miter slot 22 and is sized with respect to the miter slot so that there is clearance at both the bottom and the one side thereof, similar to that shown in FIG. 2. Two magnet inserts 66 and 68 magnetically retain the miter bar 64 to the one side of the miter slot. In this case, it is on the side toward the saw blade. Most of the length of the miter slot bar 64 is flush with the top of the table. However, bosses 70 and 72 extend above the table top in order to permit utilization of larger magnets. With this structure, the magnets can be positioned so that they reach upward with respect to the slot at least to the top surface of the table.

The top and bottom surfaces of the gage block contain T-slots 74 and 76. The top surface of the gage block is parallel to the bottom surface, and the T-slots are the same so that the gage block can be turned over, if desired. T-nut 78 is positioned within T-slot 76. Clamp screw 80 engages in the T-nut to tighten the miter slot bar 64 against the bottom of the gage block 48. In this position, with the bottom surface 50 of the gage block against the top surface 14 of the saw table, the miter slot bar 64 is above the bottom of the miter slot 22. In this way, it avoids detritus in the bottom of the slot. In addition, there is a rectangular boss 82 on the top of miter slot bar 64. The rectangular boss 82 is sized to fit tightly between the sides of the T-slot. The boss 82 is directed so that, when it is engaged in the T-slot, the front surface of the gage block is at a right angle to the magnetic side of the miter slot bar. With this structure, when the miter slot bar is engaged into the T-slot and magnetically retained against one wall thereof, the plane of the front face 52 is at a right angle with respect to the plane of the saw blade. The gage block 48 could be used in this way to measure parallelism of the miter slot 22 with respect to the plane of the saw blade, in the manner shown in FIG. 6. The gage block 48 can also be used for other purposes, such as measuring the height of the saw blade above the table surface 14, in the manner shown in FIG. 4. In this case, the level arm is positioned above the top surface of the saw table at a height desired for the depth of cut of the saw blade 18. The saw spindle height with respect to the table surface is adjusted so that the blade extends up to the bottom surface of the level arm 58, shown in FIGS. 4 and 5. In this way, the depth of cut is accurately established.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A magnetic miter slot bar:
   said magnetic miter slot bar having first and second ends, said magnetic miter slot bar having first and second faces and a top and a bottom, said bar being sized to fit within and slide in a miter bar slot in a ferrous saw table which has a top table surface, said magnetic miter slot bar having at least one magnet in said first face to hold said first face against the side of the miter slot in the ferrous saw table;
   attachment structure on said magnetic miter slot bar for retaining said bottom surface of said miter slot bar above the bottom of the miter slot in a saw table; and
   attachment structure on said magnetic miter slot bar for attaching a measuring device to said miter slot bar.

2. The magnetic miter slot bar of claim 1 wherein said structure for holding said miter slot bar above the bottom of a miter slot in a saw table comprises structure on said miter slot bar for engaging the top surface of the saw table before said miter slot bar engages the bottom of the slot.

3. The magnetic miter slot bar of claim 1 wherein said measuring device is a gage block which engages the top surface of the saw table.

4. The magnetic miter slot bar of claim 3 wherein said gage block carries a measuring device for measuring with respect to the table slot.

5. The magnetic miter slot bar of claim 3 wherein said gage block has first and second surfaces for selective engagement with the top surface of a saw table, each of said first and second surfaces having a slot therein for engagement by said slot bar, so that said gage block can engage the saw table with either of its first and second surfaces.

6. The magnetic miter slot bar of claim 3 wherein said gage block has a slot in the bottom thereof and said magnetic miter slot bar has a boss which enters into said slot.

7. The magnetic miter slot bar of claim 6 wherein said boss is rectangular and engages into said slot in said gage block in a manner to prevent rotation of said magnetic miter slot bar with respect to said gage block in order to maintain said gage block in orientation with respect to the miter slot in the saw table when the miter slot bar is in the miter slot.

8. The magnetic miter slot bar of claim 3 wherein said gage block has a bottom surface for engagement against the saw table and a side surface, said side surface being at a right angle with respect to said bottom surface, said side surface carrying first and second upright gage bars, a level arm movably mounted on said gage bars, said measuring device being mounted on said level arm, said level arm mounted on said gage block so that as said level arm is moved up and down said guide bars it maintains parallelism to said bottom surface of said gage block and to the top surface of the saw table.

9. The magnetic miter slot bar of claim 1 wherein there are first and second magnets inserted into said magnetic miter slot bar adjacent its ends.

10. A magnetic miter slot bar:
    said magnetic miter slot bar having first and second ends, said magnetic miter slot bar having a face and having at least one magnet in said face to hold said face against the side of a miter slot in a ferrous saw table having a top surface;
    first and second pins extending through said magnetic miter slot bar for retaining said miter slot bar above the bottom of a miter slot in the saw table by having said pins engage on the top table surface; and
    attachment structure on said magnetic miter slot bar for attaching a measuring device to said miter slot bar.

11. The magnetic miter slot bar of claim 10 wherein said pins are made of low friction material to form a suitable bearing pair with respect to the iron saw table.

12. A magnetic miter slot bar:
    said bar having a first end and a second end, said bar having a magnetic face, said bar having a width and a depth, said width being narrower than the miter slot in a ferrous saw table, said depth being lesser than the depth of the miter slot in the ferrous saw table, at least two magnet poles on said magnetic face of said magnetic miter slot bar so that when magnetic miter slot bar is placed in the miter slot in the ferrous saw table, it magnetically attaches itself to one side of the saw table slot; and
    attachment structure on said magnetic miter slot bar to attach a measuring device to said magnetic miter slot bar to measure with respect to the side of the saw table slot to which said magnetic miter slot bar is magnetically attached.

13. The magnetic miter slot bar of claim 12 wherein the saw table has a top surface and at least a portion of said magnetic miter slot bar extends above said top surface when it is in position in the saw table miter slot and there is table surface engaging structure on said miter slot bar above the saw table surface for riding on the saw table surface to prevent said miter slot bar from engaging in the bottom of the miter slot.

14. The magnetic miter slot bar of claim 13 wherein said saw table surface engaging structure comprises first and second ride pins which extend through said miter slot bar and engage on the saw table surface on both sides of the miter slot.

15. The magnetic miter slot bar of claim 14 wherein said pins are replaceable.

16. The magnetic miter slot bar of claim 13 wherein said table surface engaging structure holding said miter slot bar above the bottom of the saw table slot is a gage block, said gage block having a bottom surface for engagement with the saw table surface and having a front face which is at a right angle to its bottom surface, said front face carrying a measuring device;

said gage block having a T-slot in its bottom surface and said miter slot bar extending partway into said T-slot to engage said T-slot and inhibit motion of said miter slot bar with respect to said gage block, a clamp between said miter slot bar and said gage block to clamp said gage block to said miter slot bar.

17. The magnetic miter slot bar of claim 16 wherein said gage block has parallel upright guide bars on its front face and a level arm engaged on said guide bars so that said level arm lies parallel to said bottom surface as said level arm moves along said guide bars, said level arm carrying said measuring device, clamp structure for clamping said level arm with respect to said gage bar.

18. The magnetic miter slot bar of claim 17 wherein there are first and second magnets inserted into said magnetic miter slot bar adjacent its ends.

19. The magnetic miter slot bar of claim 12 wherein measuring structure is attached to said magnetic miter slot bar so that a dimension from the saw table miter slot can be measured.

20. The magnetic miter slot bar of claim 12 wherein there are first and second magnets inserted into said magnetic miter slot bar adjacent its ends.

* * * * *